(12) United States Patent
Sugishima et al.

(10) Patent No.: US 7,812,497 B2
(45) Date of Patent: Oct. 12, 2010

(54) ARMATURE, DYNAMO-ELECTRIC MACHINE AND MANUFACTURING METHOD OF ARMATURE

(75) Inventors: Kazushi Sugishima, Hamamatsu (JP); Toshiyuki Masuda, Toyohashi (JP)

(73) Assignee: Asmo Co., Ltd., Shizuoka-pref. (JP)

( * ) Notice: Subject to any disclaimer, the term of this patent is extended or adjusted under 35 U.S.C. 154(b) by 0 days.

(21) Appl. No.: 12/230,210

(22) Filed: Aug. 26, 2008

(65) Prior Publication Data

US 2009/0058213 A1 Mar. 5, 2009

(30) Foreign Application Priority Data

Aug. 28, 2007 (JP) .............................. 2007-220971

(51) Int. Cl.
*H02K 23/36* (2006.01)
*H02K 15/09* (2006.01)

(52) U.S. Cl. .................... 310/195; 310/198; 310/180; 310/179; 310/202; 310/207; 310/203; 310/208

(58) Field of Classification Search ................ 310/198, 310/180, 189, 199, 208, 203, 202, 233, 179, 310/195; *H02K 23/36, 15/09*
See application file for complete search history.

(56) References Cited

U.S. PATENT DOCUMENTS

| | | | | |
|---|---|---|---|---|
| 549,234 A * | 11/1895 | Decker | .................. | 310/195 |
| 2,660,681 A * | 11/1953 | Horne | .................. | 310/198 |
| 5,251,833 A | 10/1993 | Furuhashi et al. | | |
| 5,383,619 A * | 1/1995 | Cardini et al. | ........... | 242/433.3 |
| 5,661,355 A * | 8/1997 | Darceot | .................. | 310/180 |
| 6,320,293 B1 | 11/2001 | Yamada et al. | | |
| 6,812,610 B2 * | 11/2004 | Kim et al. | .................. | 310/184 |
| 7,213,579 B2 * | 5/2007 | Ikeya | .................. | 123/497 |
| 7,583,000 B2 * | 9/2009 | Durham et al. | ............. | 310/180 |
| 7,619,345 B2 * | 11/2009 | Kalsi et al. | .................. | 310/208 |
| 2004/0201302 A1 * | 10/2004 | Tanaka et al. | ............... | 310/179 |
| 2006/0244334 A1 | 11/2006 | Furui | | |
| 2006/0261700 A1 * | 11/2006 | Du et al. | .................. | 310/234 |

* cited by examiner

*Primary Examiner*—Quyen Leung
*Assistant Examiner*—Terrance Kenerly
(74) *Attorney, Agent, or Firm*—Posz Law Group, PLC

(57) ABSTRACT

A total number of windings in an armature is an even number. The windings are divided into a first winding group and a second winding group. The windings of the first winding group are arranged one after another at generally equal angular intervals without overlapping with each other. The windings of the second winding group are arranged one after another at generally equal angular intervals without overlapping with each other and are wound separately from the windings of the first winding group.

20 Claims, 10 Drawing Sheets

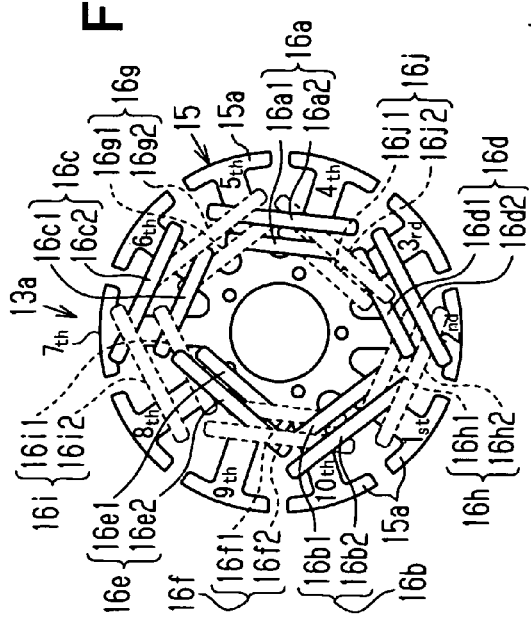
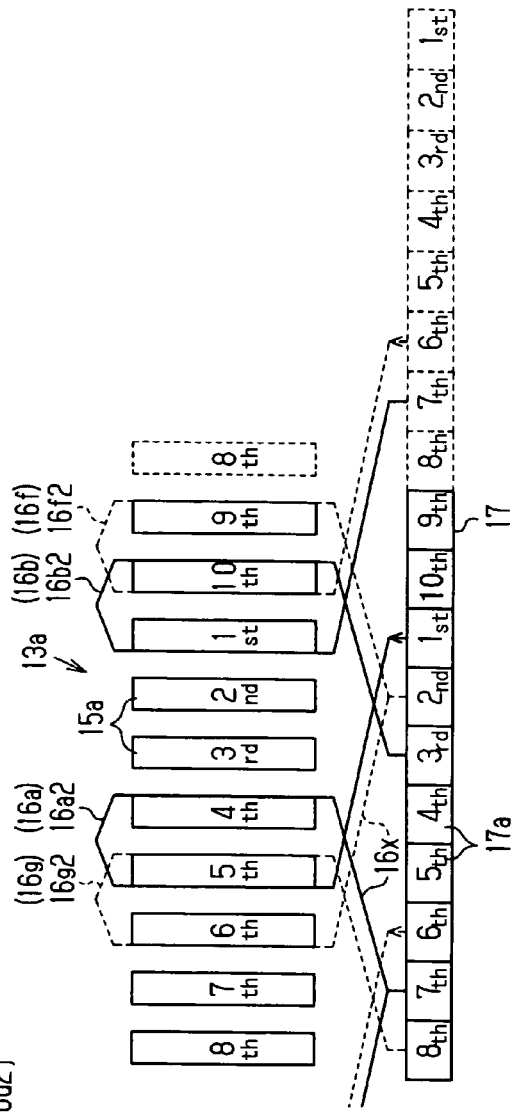
FIG. 4C
FIG. 4D

ARMATURE, DYNAMO-ELECTRIC MACHINE AND MANUFACTURING METHOD OF ARMATURE

CROSS REFERENCE TO RELATED APPLICATION

This application is based on and incorporates herein by reference Japanese Patent Application No. 2007-220971 filed on Aug. 28, 2007.

BACKGROUND OF THE INVENTION

1. Field of the Invention

The present invention relates to an armature, a dynamo electric machine having the same and a manufacturing method of the armature.

2. Description of Related Art

In an armature, each of conductive wires (magnet wires) is wound around each corresponding one of teeth of an armature core to form a plurality of windings. When an electric power is supplied from a commutator to the windings, the armature is rotated. In a case where the windings are wound by a lap winding method for partially overlapping the circumferentially adjacent windings, particularly when a deviation of a center of mass of the armature from a rotational center of the armature is relatively large, the rotational balance of the armature is deteriorated to cause vibrations during the rotation of the armature. Therefore, after the winding process, a corrective material is applied to the armature to perform a plus correction, or a portion of the armature core is cut to perform a minus correction, so that the weight balance of the armature is adjusted to achieve the relatively good balance.

However, the separate step, such as the adding of the corrective material or the cutting of the portion of the armature core, is required. Also, the number of components is increased by the corrective material. Also, a dedicate device for limiting dispersion of the corrective material is required. Furthermore, a dedicate tool for cutting the armature core is required. Therefore, the above method is not desirable.

In view of the above disadvantages, Japanese Examined Patent Publication No. H07-34630B2 (corresponding to U.S. Pat. No. 5,251,833) teaches the armature, in which the number of turns of each corresponding winding is adjusted to achieve the relatively good weight balance. In this way, the step, which is performed after the winding process to correct the balance, can be eliminated.

However, when the number of turns of each corresponding winding is changed to achieve the relatively good weight balance of the armature, a magnetic unbalance occurs due to the difference in the number of turns of the winding from one winding to another winding. Therefore, the armature is vibrated during its rotation due to the magnetic unbalance. As a result, the above method of changing the number of turns of each corresponding winding is not advantageous.

SUMMARY OF THE INVENTION

The present invention addresses the above disadvantage. According to one aspect of the present invention, there is provided an armature, which includes a commutator, an armature core and a plurality of windings. The armature core is rotatable together with the commutator and includes a plurality of teeth, which are arranged one after another at generally equal angular intervals. Each of the plurality of windings is wound around corresponding two or more of the plurality of teeth and is connected to the commutator. Each circumferentially adjacent two of the plurality of windings partially overlap with each other. A total number of the plurality of windings is an even number. The plurality of windings is divided into a first winding group and a second winding group. The windings of the first winding group are arranged one after another at generally equal angular intervals without overlapping with each other. The windings of the second winding group are arranged one after another at generally equal angular intervals without overlapping with each other and are wound separately from the windings of the first winding group. A dynamoelectric machine may have the above armature.

Also, there is provided a manufacturing method of an armature. According to the method, a commutator and an armature core are provided. The armature core is rotated together with the commutator and includes a plurality of teeth, which are arranged one after another at generally equal angular intervals. Furthermore, a plurality of windings is formed such that each of the plurality of windings is wound around corresponding two or more of the plurality of teeth and is connected to the commutator, each circumferentially adjacent two of the plurality of windings partially overlap with each other, a total number of the plurality of windings is an even number, the plurality of windings is divided into a first winding group and a second winding group, the windings of the first winding group are arranged one after another at generally equal angular intervals without overlapping with each other, and the windings of the second winding group are arranged one after another at generally equal angular intervals without overlapping with each other and are wound separately from the windings of the first winding group.

BRIEF DESCRIPTION OF THE DRAWINGS

The invention, together with additional objectives, features and advantages thereof, will be best understood from the following description, the appended claims and the accompanying drawings in which:

FIG. 4C is a cross sectional view showing the armature according the second embodiment of the present invention after a second winding cycle;

FIG. 4D is a partial deployed winding diagram of the armature shown in FIG. 4C;

DETAILED DESCRIPTION OF THE INVENTION

First Embodiment

A first embodiment of the present invention will be described with reference to the accompanying drawings.

Figure 1A:
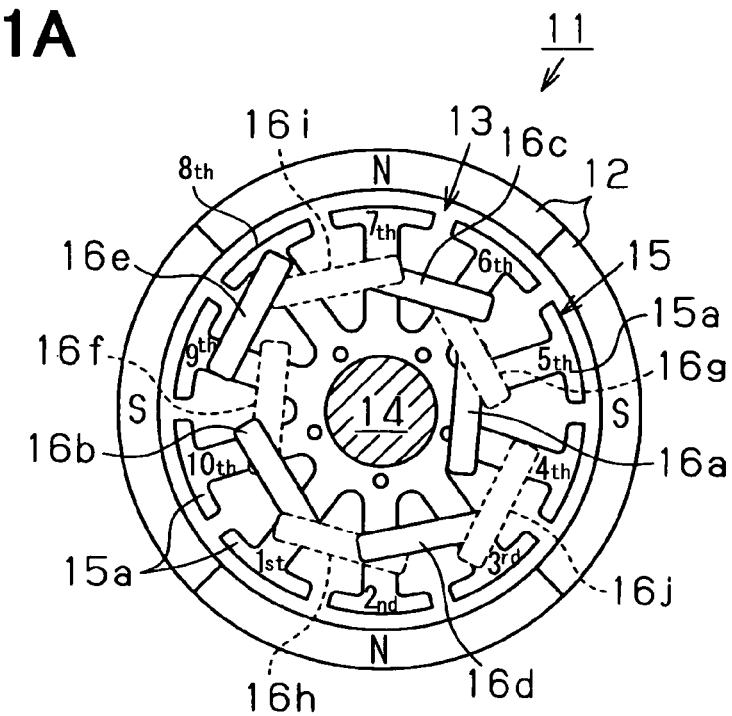
FIG. 1A is a cross sectional view of an armature according to a first embodiment of the present invention.

FIG. 1A is a diagram showing a direct current motor 11, which serves as a dynamo-electric machine according to the present embodiment. In the motor 11 of the present embodiment, magnets 12, which form four magnetic poles and serve as a field system, are fixed to an inner peripheral surface of a yoke housing (not shown), and an armature 13 is rotatably received at radially inward of the magnets 12 in the yoke housing.

Figure 1B:
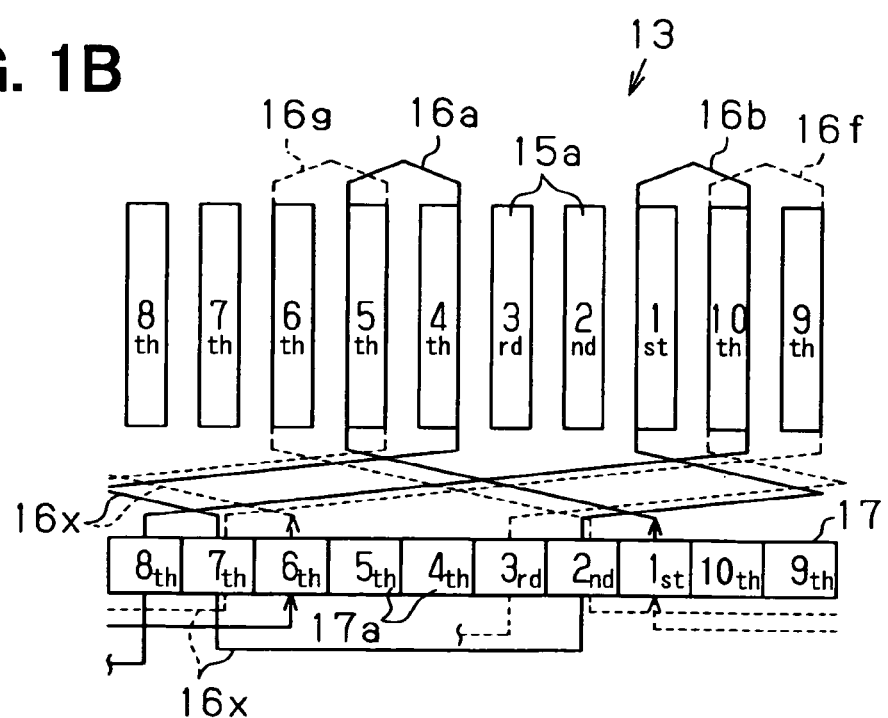
FIG. 1B is a partial deployed winding diagram of the armature shown in FIG. 1A.

The armature 13 includes a rotatable shaft 14 and an armature core 15. The armature core 15 is made of a magnetic metal material and is fixed to the rotatable shaft 14. Ten radially projecting teeth 15a are provided in the armature core 15 such that the teeth 15a are arranged one after another at generally equal intervals in a circumferential direction (a rotational direction of the armature core 15). A conductive wire, i.e., a magnet wire 16x (see FIG. 1B) is wound around each corresponding two of the teeth 15a multiple times, so that ten windings 16a-16j are formed at equal intervals. Each circumferentially adjacent two of the windings 16a-16j overlap over the corresponding one of the teeth 15a. A commutator 17 is fixed to the rotatable shaft 14 and includes ten segments 17a along an outer peripheral surface of the commutator 17, as shown in FIG. 1B. The windings 16a-16j are connected to the corresponding segments 17a. Power supply brushes (not shown) are placed at magnetic pole centers of the magnets 12 and contact the corresponding segments 17a to supply an electric power to the windings 16a-16j of the armature 13 to rotate the armature 13.

Next, a winding method of the windings 16a-16j at the armature 13 according to the present embodiment will be described with reference to FIGS. 1A and 1B. In the following description, the ten teeth 15a will be referred to as first to tenth (1st to 10th) teeth 15a, which are arranged in this order in the counterclockwise direction in FIG. 1A. Also, the ten segments 17a of the commutator 17 will be referred to as first to tenth (1st to 10th) segments 17a, which are arranged in this order in the counterclockwise direction in FIG. 1A. Furthermore, in the present embodiment, a double flyer armature winding machine is used to simultaneously wind corresponding two of the windings 16a-16j starting from two diametrically opposed segments 17a (teeth 15a) to the corresponding subsequent teeth 15a, which are displaced by about 180 degrees. In this case, the windings 16a-16e, which are arranged one after another in the circumferential direction without overlapping with each other in the circumferential direction, will be collectively referred to as a first winding group, and the other remaining windings 16f-16j, which are arranged one after another in the circumferential direction without overlapping with each other in the circumferential direction, will be collectively referred to as a second winding group. The first flyer of the winding machine is used to continuously wind the windings 16a-16e of the first winding group using the corresponding conductive wire (first magnet wire) 16x fed from the first flyer, and the second flyer of the winding machine is used to continuously wind the windings 16f-16j of the second winding group using the corresponding conductive wire (second magnet wire) 16x fed from the second flyer.

Specifically, with use of the first flyer, the conductive wire 16x is extended from the first segment 17a (serving as a winding start segment) and is wound around the fifth and fourth teeth 15a a predetermined number of times to form a first winding 16a of the first winding group, and then the conductive wire 16x is extended from the fourth tooth 15a to the second segment 17a where the conductive wire 16x is hooked. Then, the conductive wire 16x is extended from the second segment 17a to the seventh segment 17a where the conductive wire 16x is hooked, so that a short-circuit line is formed between the second segment 17a and the seventh segment 17a. Next, the conductive wire 16x is extended from the seventh segment 17a and is wound around the first and tenth teeth 15a a predetermined number of times to form a second winding 16b of the first winding group, and then the conductive wire 16x is extended from the tenth tooth 15a to the eighth segment 17a where the conductive wire 16x is hooked. Thereafter, the conductive wire 16x is extended from the eighth segment 17a to the third segment 17a where the conductive wire 16x is hooked, and the above procedure is repeated, so that the conductive wire 16x is hooked to the first segment 17a once again, and thereby the winding operation of the five windings 16a-16e using the first flyer is completed.

With use of the second flyer, the conductive wire 16x is extended from the sixth segment 17a (serving as a winding start segment) and is wound around the tenth and ninth teeth 15a a predetermined number of times to form a first winding 16f of the second winding group, and then the conductive wire 16x is extended from the ninth tooth 15a to the seventh segment 17a where the conductive wire 16x is hooked. Then, the conductive wire 16x is extended from the seventh segment 17a to the second segment 17a where the conductive wire 16x is hooked, so that a short-circuit line is formed between the seventh segment 17a and the second segment 17a. Next, the conductive wire 16x is extended from the second segment 17a and is wound around the sixth and fifth teeth 15a a predetermined number of times to form a second winding 16g of the second winding group, and then the conductive wire 16x is extended from the fifth tooth 15a to the third segment 17a where the conductive wire 16x is hooked. Thereafter, the conductive wire 16x is extended from the third segment 17a to the eighth segment 17a where the conductive wire 16x is hooked, and the above procedure is repeated, so that the conductive wire 16x is hooked to the sixth segment 17a once again. Thereby, the winding operation of the five windings 16f-16j using the second flyer is completed.

That is, the windings 16a-16e of the first winding group, which are wound by the first flyer, are arranged one after another at generally equal angular intervals, and the windings 16f-16j of the second winding group, which are wound by the second flyer, are arranged one after another at generally equal angular intervals. Furthermore, the windings 16a-16e of the first winding group and the windings 16f-16j of the second winding group are alternately arranged (are staggered).

Figure 7A:
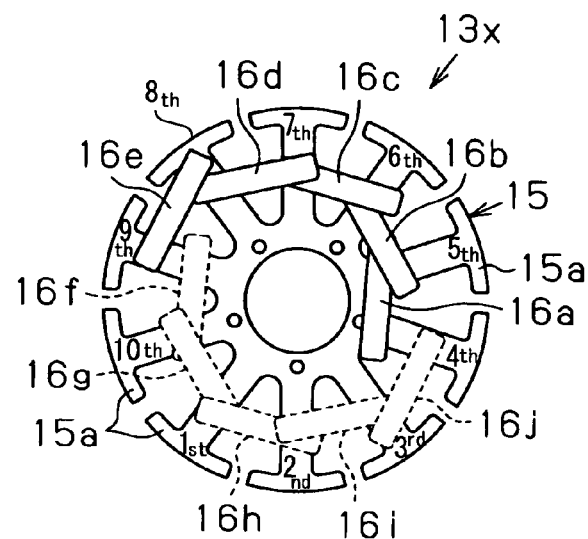
FIG. 7A is a cross sectional view of a prior art armature.
Figure 7B:
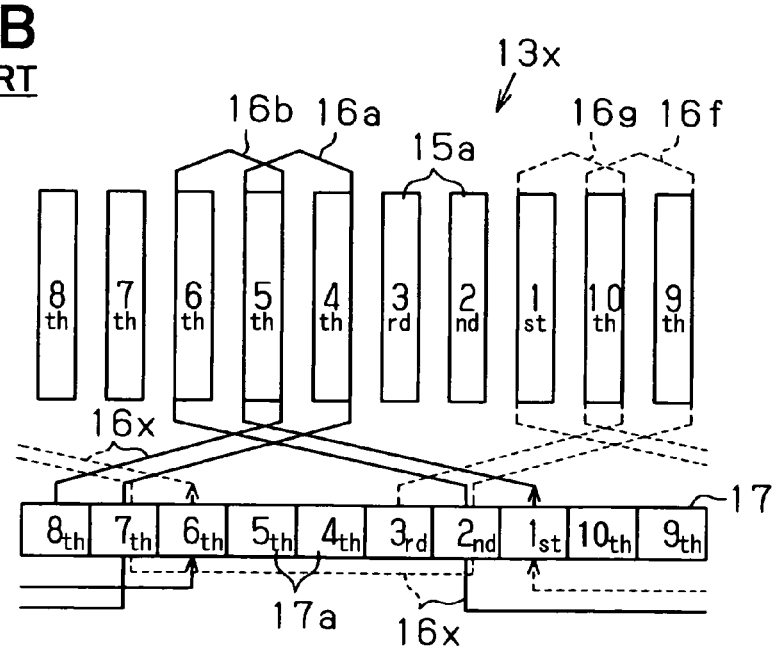
FIG. 7B is a partial deployed winding diagram of the prior art armature shown in FIG. 7A.

Now, for the comparative purpose, an armature 13x, which is wound by using a prior art winding method, will be described with reference to FIGS. 7A and 7B. In this case, the double flyer armature winding machine is also used.

With use of the first flyer, the conductive wire 16x is extended from the first segment 17a (serving as a winding start segment) and is wound around the fifth and fourth teeth 15a a predetermined number of times to form a first winding 16a of the first winding group, and then the conductive wire 16x is extended from the fourth tooth 15a to the seventh segment 17a where the conductive wire 16x is hooked. Then, the conductive wire 16x is extended from the seventh segment 17a to the second segment 17a where the conductive wire 16x is hooked to form a short-circuit line between the seventh segment 17a and the second segment 17a, and the conductive wire 16x is extended from the second segment 17a and is wound around the sixth and fifth teeth 15a a predetermined number of times to form a second winding 16b of the first winding group. Then, the conductive wire 16x is extended from the fifth tooth 15a to the eighth segment 17a where the conductive wire 16x is hooked. Thereafter, the conductive wire 16x is extended from the eighth segment 17a to the third segment 17a where the conductive wire 16x is hooked to form a short-circuit line (not shown) between the eighth segment 17a and the third segment 17a. The above procedure is repeated, and thereby the conductive wire 16x is hooked to the first segment 17a once again, so that the winding operation of the five windings 16a-16e using the first flyer is completed.

With use of the second flyer, the conductive wire 16x is extended from the sixth segment 17a (serving as a winding start segment) and is wound around the tenth and ninth teeth 15a a predetermined number of times to form a first winding 16f of the second winding group, and then the conductive wire 16x is extended from the ninth tooth 15a to the second segment 17a where the conductive wire 16x is hooked. Then, the conductive wire 16x is extended from the second segment 17a to the seventh segment 17a where the conductive wire 16x is hooked, so that a short-circuit line is formed between the second segment 17a and the seventh segment 17a. Next, the conductive wire 16x is extended from the seventh segment 17a and is wound around the first and tenth teeth 15a a predetermined number of times to form a second winding 16g of the second winding group. Then, the conductive wire 16x is extended from the tenth tooth 15a to the third segment 17a where the conductive wire 16x is hooked. Thereafter, the conductive wire 16x is extended from the third segment 17a to the eighth segment 17a where the conductive wire 16x is hooked to form a short-circuit line (not shown) between the third segment 17a and the eighth segment 17a, and the above procedure is repeated, so that the conductive wire 16x is hooked to the sixth segment 17a once again. Thereby, the winding operation of the five windings 16f-16j using the second flyer is completed.

That is, in the prior art winding method, the windings 16a-16e, which are wound by the first flyer, occupy one half of the armature core 15, and the windings 16f-16j, which are wound by the second flyer, occupy the remaining half of the armature core 15. In the case of the double flyer armature winding machine, the two conductive wires 16x used in the first and second flyers, respectively, tend to show a weight difference therebetween. The weight difference in the conductive wires 16x used in the flyers may cause a deviation in the center of mass of the armature 13x from the rotational center of the armature 13x.

Figure 8A:
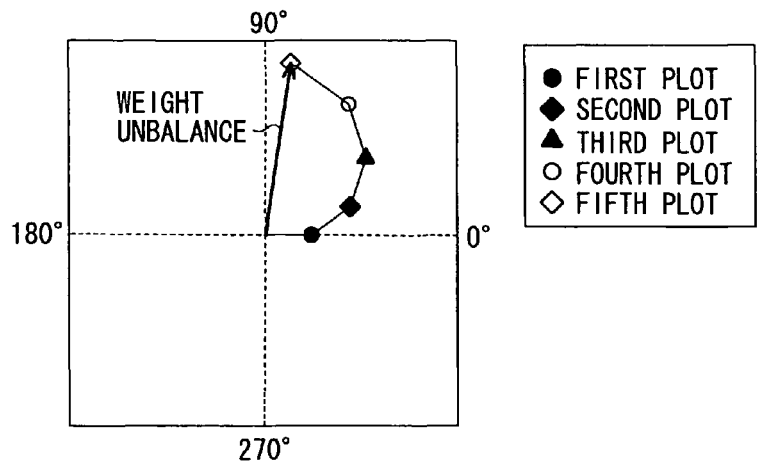
FIGS. 8A-8C are diagrams showing balance characteristics of the prior art armature shown in FIGS. 7A and 7B.
Figure 8B:
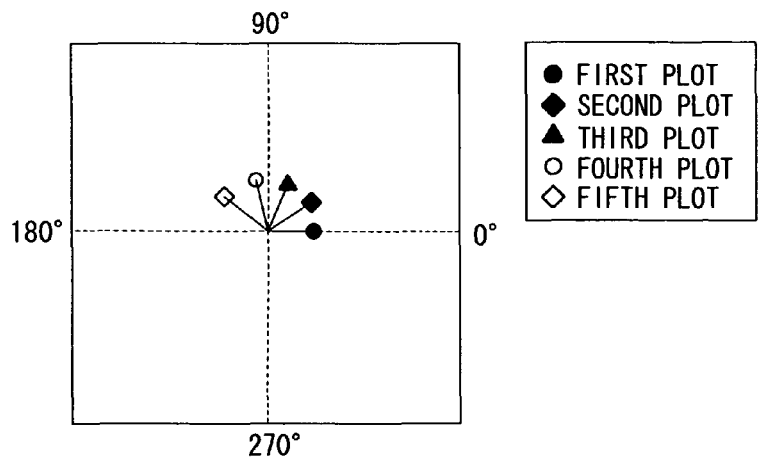
Figure 8C:
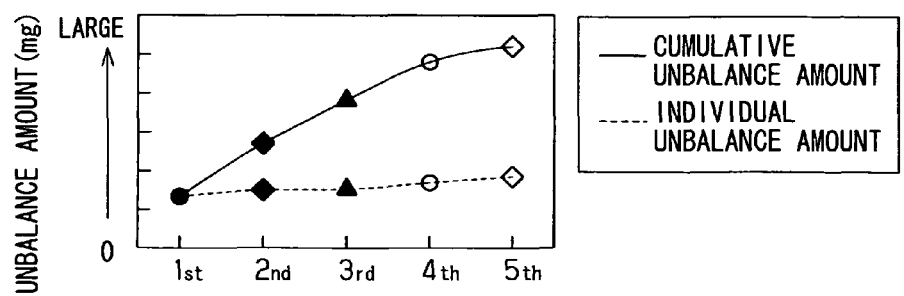

Here, for the descriptive purpose, the following situation is assumed. That is, the weight per unit amount (the weight of the conductive wire wound for a predetermined number of times) of the conductive wire 16x used in the windings 16a-16e wound by the first flyer is heavier than that of the windings 16f-16j wound by the second flyer by a predetermined weight difference. The deviation in the center of mass of the prior art armature 13x is tested for this situation. FIGS. 8A to 8C indicate the test result.

In FIG. 8C, a dotted line is a line that connects first to fifth plots, which show individual unbalance amounts, respectively. Specifically, the first plot (a shaded circle) along the dotted line indicates an unbalance amount (a weight difference) between the first winding 16a of the first winding group and the first winding 16f of the second winding group. The second plot (a shaded diamond) along the dotted line indicates an unbalance amount between the second winding 16b of the first winding group and the second winding 16g of the second winding group. The third plot (a shaded triangle) along the dotted line indicates an unbalance amount between the third winding 16c of the first winding group and the third winding 16h of the second winding group. The fourth plot (a blank circle) along the dotted line indicates an unbalance amount between the fourth winding 16d of the first winding group and the fourth winding 16i of the second winding group. Finally, the fifth plot (a blank diamond) along the dotted line indicates an unbalance amount between the fifth winding 16e of the first winding group and the fifth winding 16j of the second winding group. The above first to fifth plots along the dotted line in FIG. 8C provide the unbalance amounts without directional indications. FIG. 8B indicates the first to fifth plots along the dotted line of FIG. 8C using vectors to indicate the individual unbalance amounts together with directions thereof (using vector lines) from the rotational center of the armature 13x. In FIG. 8B, the depicted angles indicate angles of the plots with respect to the rotational center of the armature 13x.

Furthermore, in FIG. 8C, a solid line is a line that connects first to fifth plots, which indicate cumulative unbalance amounts, respectively. Specifically, the cumulative unbalance amount at the first plot (the solid circle) along the solid line is the individual unbalance amount at the first plot along the dotted line. The cumulative unbalance amount at the second plot (the solid diamond) is the sum of the individual unbalance amount at the first plot along the dotted line (i.e., the unbalance amount between the first winding 16a and the first winding 16f) and the individual unbalance amount at the second plot along the dotted line (i.e., the unbalance amount between the second winding 16b and the second winding 16g). The cumulative unbalance amount at the third plot (the solid triangle) is the sum of the individual unbalance amount at the first plot along the dotted line (i.e., the unbalance amount between the first winding 16a and the first winding 16f), the individual unbalance amount at the second plot along the dotted line (i.e., the unbalance amount between the second winding 16b and the second winding 16g) and the individual unbalance amount at the third plot along the dotted line (i.e., the unbalance amount between the third winding 16c and the third winding 16h). The other cumulative unbalance amounts at the fourth and fifth plots along the solid line should be interpreted in a manner similar to those of the above described ones. FIG. 8A indicates the first to fifth plots along the solid line in FIG. 8C using vectors to indicate the cumulative unbalance amounts together with directions thereof. In FIG. 8A, the depicted angles indicate the angles of the plots with respect to the rotational center of the armature 13x. Also, in FIG. 8A, a line, which interconnects the first to fifth plots, merely indicate the winding sequence of the first to fifth windings. Furthermore, in FIG. 8A, for the sake of simplicity, only the fifth plot (the blank diamond) is indicated with the vector line. Since the fifth plot (the blank diamond) is obtained after completion of winding of all of the first to fifth windings of each winding group, the fifth plot should be considered as the cumulative unbalance amount with respect to all of the first to fifth windings.

Referring back to FIG. 8B, in the comparison between the first winding 16a wound by the first flyer and the first winding 16f wound by the second flyer, the center of mass is deviated on the winding 16a side, as indicated by the first plot (the shaded circle), due to the fact that the heavier conductive wire 16x is used at the first flyer. Similarly, in the comparison between the winding 16b and the winding 16g, the center of mass is deviated on the winding 16b side, and so on. Thus, the center of mass is deviated on the winding 16a-16e side where the windings 16a-16e are wound by the first flyer. Thereby, in the case of the prior art armature 13x, in which the windings 16a-16e wound by the first flyer are biased, i.e., are concentrated in the one side of the armature core 15, the center of mass is substantially biased (decentered) from the rotational center on the one side, thereby resulting in a large weight unbalance, as shown in FIGS. 8A and 8C.

Figure 2A:
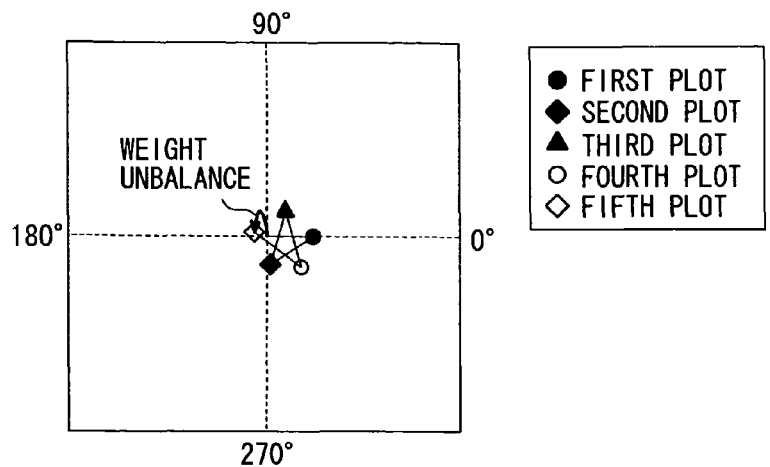
FIGS. 2A-2C are diagrams showing balance characteristics of the armature of the first embodiment.
Figure 2B:
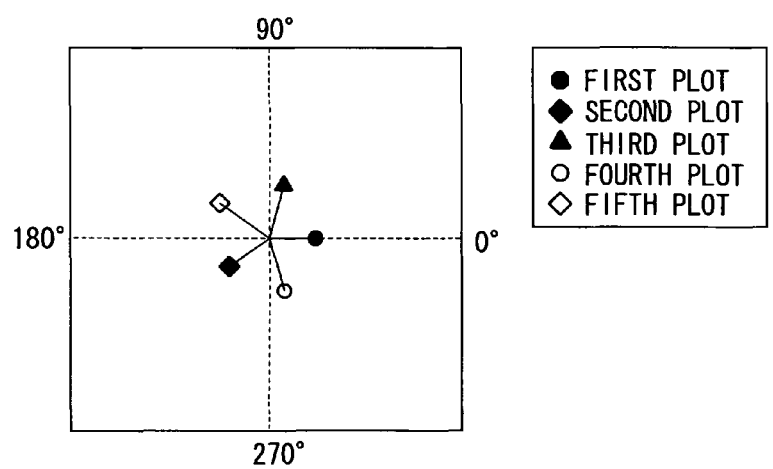
Figure 2C:
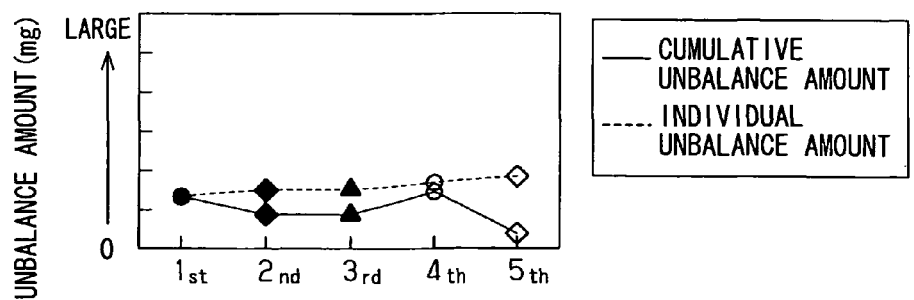

Now, there will be described a test result of a deviation in the center of mass of the armature 13 of the present embodiment in the case where the weight per unit amount (the weight of the conductive wire wound for the predetermined number of times) of the conductive wire 16x used in the windings 16a-16e wound by the first flyer is heavier than that of the windings 16f-16j wound by the second flyer by the predetermined weight. FIGS. 2A to 2C indicate this test result. FIGS. 2A to 2C are diagrams similar to those of FIGS. 8A to 8C, respectively, so that detail descriptions of the first to fifth plots in FIGS. 2A to 2C will not be described for the sake of simplicity. Also, it should be noted that the vector line of the fifth plot (the blank diamond) in FIG. 2A is indicated by the bent line rather than using the straight line. Here, the bent line is used to ease the visualization of the vector. However, in reality, it should be a straight line like that of FIG. 8A.

As shown in FIG. 2B, in the comparison between the first winding 16a wound by the first flyer and the first winding 16f wound by the second flyer, the center of mass is deviated on the winding 16a side, as indicated by the first plot (the shaded circle), due to the fact that the heavier conductive wire 16x is used at the first flyer, like in the above described case. Similarly, in the comparison between the second winding 16b and the second winding 16g, the center of mass is deviated on the winding 16b side, as indicated by the second plot (the shaded diamond), and so on. Thus, the center of mass is deviated in the comparison of the individual windings (the individual unbalance amounts). However, according to the winding method of the present embodiment, the windings 16a-16e, which are wound by the first flyer, are arranged one after another at the generally equal angular intervals in the circumferential direction, and the windings 16f-16j, which are wound by the second flyer, are arranged one after another at the generally equal angular intervals in the circumferential direction. In this way, the deviation in the center of mass, which is encountered in the windings of the same winding order, is substantially canceled. Thus, in the armature 13 of the present embodiment, the armature 13 is formed as a product, in which the center of mass of the armature 13 is located at or adjacent to the rotational center of the armature 13 (resulting in a small weight unbalance), as shown in FIGS. 2A and 2C (particularly, see the significant difference between the fifth plot of FIG. 2A and the fifth plot of FIG. 8A). In other words, when the winding method of the present embodiment is adapted, the influence of the weight difference in the conductive wires 16x used in the flyers, respectively, becomes substantially small. Thus, the relatively good weight balance of the armature 13 can be always achieved.

Figure 3A:
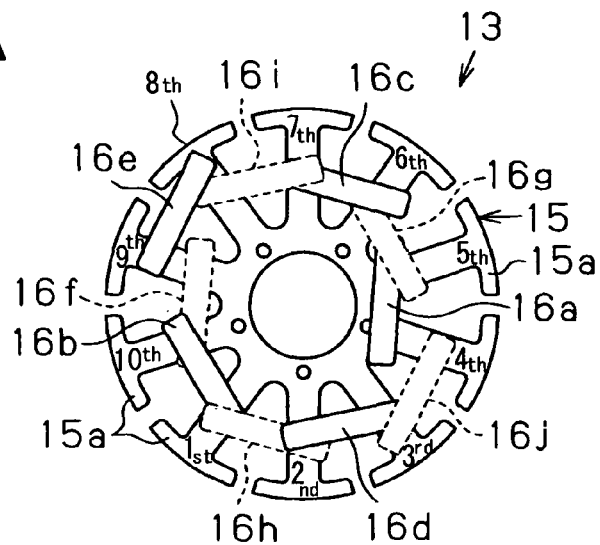
FIG. 3A is a cross sectional view showing a modification of the armature of the first embodiment.
Figure 3B:
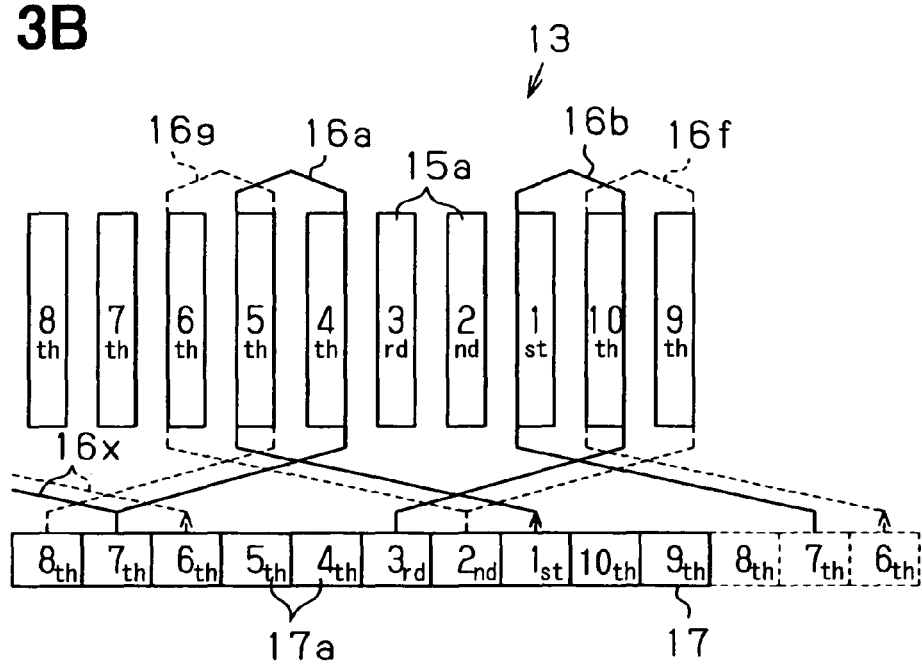
FIG. 3B is a partial deployed winding diagram of the armature shown in FIG. 3A.
Figure 4A:
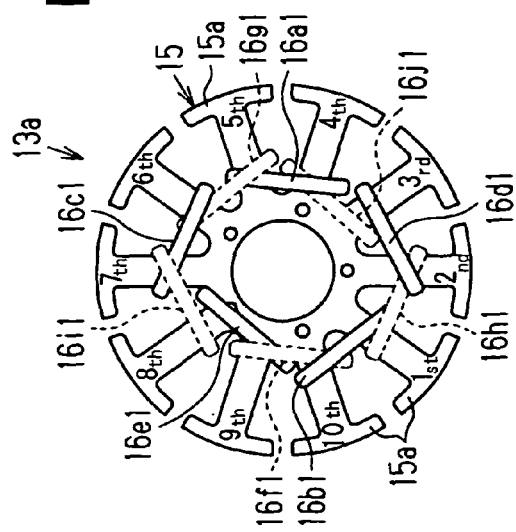
FIG. 4A is a cross sectional view showing an armature according to a second embodiment of the present invention after a first winding cycle.
Figure 4B:
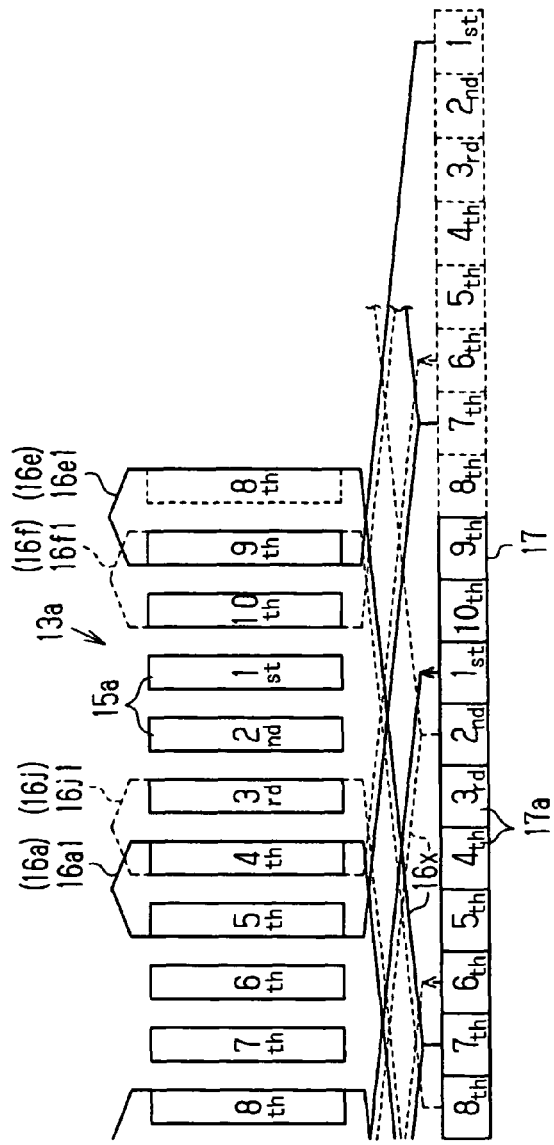
FIG. 4B is a partial deployed winding diagram of the armature shown in FIG. 4A.

FIGS. 3A and 3B show a modification of the armature 13 of FIGS. 1A and 1B. In FIGS. 3A and 3B, the short-circuit lines of FIGS. 1A and 1B, each of which connects between corresponding two of the segments 17a, are eliminated. The winding method of such an armature 13 using the double flyer armature winding machine will be described.

As shown in FIGS. 3A and 3B, with use of the first flyer, the conductive wire 16x is extended from the first segment 17a (serving as a winding start segment) and is wound around the fifth and fourth teeth 15a a predetermined number of times to form a first winding 16a, and then the conductive wire 16x is extended from the fourth tooth 15a to the seventh segment 17a where the conductive wire 16x is hooked. Then, the conductive wire 16x is extended from the seventh segment 17a and is wound around the first and tenth teeth 15a a predetermined number of times to form a second winding 16b. Thereafter, the conductive wire 16x is extended from the tenth tooth 15a to the third segment 17a where the conductive wire 16x is hooked. Thereafter, the conductive wire 16x is extended from the third segment 17a, and the above procedure is repeated, so that the conductive wire 16x is finally hooked to the first segment 17a once again. Thereby, the winding operation of the five windings 16a-16e using the first flyer is completed.

With use of the second flyer, the conductive wire 16x is extended from the sixth segment 17a (serving as a winding start segment) and is wound around the tenth and ninth teeth 15a a predetermined number of times to form a first winding 16f. Then, the conductive wire 16x is extended from the ninth tooth 15a to the second segment 17a where the conductive wire 16x is hooked. Then, the conductive wire 16x is extended from the second segment 17a and is wound around the sixth and fifth teeth 15a a predetermined number of times to form a second winding 16g. Next, the conductive wire 16x is extended from the fifth tooth 15a to the eighth segment 17a where the conductive wire 16x is hooked. Thereafter, the conductive wire 16x is extended from the eighth segment 17a, and the above procedure is repeated, so that the conductive wire 16x is finally hooked to the sixth segment 17a once again. Thereby, the winding operation of the five windings 16f-16j using the second flyer is completed.

Even with the above winding method, the windings 16a-16e, which are wound by the first flyer, are arranged one after another at generally equal angular intervals in the circumferential direction, and the windings 16f-16j, which are wound by the second flyer, are arranged one after another at generally equal intervals in the circumferential direction. Furthermore, the windings 16a-16e, which are wound by the first flyer, and the windings 16f-16j, which are wound by the second flyer, are alternately arranged (are staggered). Therefore, even in the case of the armature 13 shown in FIGS. 3A and 3B, the armature 13 is formed as a product, in which the center of mass of the armature 13 is located at or adjacent to the rotational center of the armature 13 to achieve the relatively good weight balance.

Next, advantages of the first embodiment (and the modification thereof) will be described.

(1) In the armature 13 of the present embodiment, the windings 16a-16e, which are arranged one after another at generally equal angular intervals in the circumferential direction without overlapping with each other in the circumferential direction, are collectively referred to as the first winding group, and the other remaining windings 16f-16j, which are arranged one after another at generally equal angular intervals in the circumferential direction without overlapping with each other in the circumferential direction, are collectively referred to as the second winding group. The windings 16a-

16e of the first winding group and the windings 16f-16j of the second winding group are wound separately. In this way, the armature 13 of the present embodiment is generally uniformly structured in the rotational direction, so that the deviation in the center of mass of the armature 13 becomes relatively small to implement the relatively good rotational balance. Thus, in the direct current motor 11, which has such an armature 13, the vibrations can be well limited at the time of rotation of the motor 11.

(2) In the armature 13 of the present embodiment, the windings 16a-16e of the first winding group and the windings 16f-16j of the second winding group are wound from the two locations, respectively. In this armature 13, the double flyer armature winding machine is used as the armature winding machine, and thereby the weight difference tends to occur in the conducive wires 16x used in the flyers. In view of this, the windings 16a-16e of the first winding group are wound by the first flyer such that the windings 16a-16e are arranged one after another at the generally equal angular intervals in the circumferential direction, and the windings 16f-16j of the second winding group are wound by the second flyer such that the windings 16f-16j are arranged one after another at the generally equal angular intervals in the circumferential direction. In this way, the influence of the weight difference in the conductive wires 16x used in the flyers on the deviation in the center of mass of the armature 13 can be made relatively small. Thereby, while the double flyer armature winding machine, which can complete the winding operation within the relatively short period of time, is used, the armature 13, which achieves the relatively good rotational balance, is implemented.

(3) In the armature 13 of the present embodiment, the number of the windings 16a-16e of the first winding group is set to be the odd number, and the number of the windings 16f-16j of the second winding group is set to be the odd number. Thus, the winding operation is simultaneously conducted for the two diametrically opposed windings (i.e., the two windings displaced by about 180 degrees from each other) at one step and then for the next two diametrically opposed windings in the next step (e.g., the two windings 16a, 16f in the one step and the two windings 16b, 16g in the next step, and so on). In this way, the states of each diametrically opposed two of the windings 16a-16j are generally the same. As a result, the armature 13 of the present embodiment is more uniformly structured in the rotational direction.

(4) In the armature 13 of the present embodiment, the windings 16a-16e of the first winding group and the windings 16f-16j of the second winding group are wound sequentially from the two locations, respectively, which are most distantly spaced from each other. In this way, the windings 16a-16j are continuously wound, and thereby the biasing in the winding condition of the windings 16a-16j is alleviated. Thus, the windings 16a-16j are arranged uniformly in the rotational direction.

(5) In the armature 13 of the present embodiment, the windings 16a-16e of the first winding group and the windings 16f-16j of the second winding group are wound simultaneously by the two flyers of the double flyer armature winding machine. Thus, the armature 13 can be manufactured within the relatively short period of time.

Second Embodiment

A second embodiment of the present invention will be described with reference to the accompanying drawings.

As shown in FIGS. 4A to 4D, in the armature 13a of the present embodiment, ten windings 16a-16j are wound around the corresponding teeth 15a by using the double flyer armature winding machine in such a manner that the windings 16a-16j are wound twice around the armature core 15 in two winding cycles (i.e., each of the windings 16a-16j being wound in two steps). In the present embodiment, since the windings 16a-16j are wound in the two winding cycles around the armature core 15, the number of turns of each winding around the corresponding two teeth in each winding cycle around the armature core 15 is reduced to one half.

Specifically, in the first winding cycle around the armature core 15, with use of the first flyer, the conductive wire 16x is extended from the first segment 17a (serving as a winding start segment) and is wound around the ninth and eighth teeth 15a a predetermined number of times to form a first winding 16e1. Then, the conductive wire 16x is extended from the eighth tooth 15a to the seventh segment 17a where the conductive wire 16x is hooked. Next, the conductive wire 16x is extended from the seventh segment 17a and is wound around the fifth and fourth teeth 15a a predetermined number of times to form a second winding 16a1. Thereafter, the conductive wire 16x is extended from the fourth tooth 15a to the third segment 17a where the conductive wire 16x is hooked. Then, the conductive wire 16x is extended from the third segment 17a, and the above procedure is repeated, so that the conductive wire 16x is finally hooked to the first segment 17a once again. Thereby, the winding operation of the windings 16a1-16e1 (the half windings of the windings 16a-16e) using the first flyer is completed.

In the first winding cycle around the armature core 15, with use of the second flyer, the conductive wire 16x is extended from the sixth segment 17a (serving as a winding start segment) and is wound around the fourth and third teeth 15a a predetermined number of times to form a first winding 16j1. Then, the conductive wire 16x is extended from the third tooth 15a to the second segment 17a where the conductive wire 16x is hooked. Then, the conductive wire 16x is extended from the second segment 17a and is wound around the tenth and ninth fifth teeth 15a a predetermined number of times to form a second winding 16f1. Thereafter, the conductive wire 16x is extended from the ninth tooth 15a to the eighth segment 17a where the conductive wire 16x is hooked. Next, the conductive wire 16x is extended from the eighth segment 17a, and the above procedure is repeated, so that the conductive wire 16x is finally hooked to the sixth segment 17a once again. Thereby, the winding operation of the windings 16f1-16j1 (the half windings of the windings 16f-16j) using the second flyer is completed.

Next, in the second winding cycle around the armature core 15, with use of the first flyer, the conductive wire 16x is extended from the first segment 17a and is wound around the fifth and fourth teeth 15a a predetermined number of times to form a first winding 16a2 of the second winding cycle, and then the conductive wire 16x is extended from the fourth tooth 15a to the seventh segment 17a where the conductive wire 16x is hooked. Then, the conductive wire 16x is extended from the seventh segment 17a and is wound around the first and tenth teeth 15a a predetermined number of times to form a second winding 16b2. Thereafter, the conductive wire 16x is extended from the tenth tooth 15a to the third segment 17a where the conductive wire 16x is hooked. Thereafter, the conductive wire 16x is extended from the third segment 17a, and the above procedure is repeated, so that the conductive wire 16x is finally hooked to the first segment 17a once again. Thereby, the winding operation of the windings 16a2-16e2 (the remaining half windings of the windings 16a-16e) using the first flyer is completed.

In the second winding cycle around the armature core 15, with use of the second flyer, the conductive wire 16x is extended from the sixth segment 17a and is wound around the tenth and ninth teeth 15a a predetermined number of times to form a first winding 16f2 of the second winding cycle. Then, the conductive wire 16x is extended from the ninth tooth 15a to the second segment 17a where the conductive wire 16x is hooked. Next, the conductive wire 16x is extended from the second segment 17a and is wound around the sixth and fifth teeth 15a a predetermined number of times to form a second winding 16g2. Thereafter, the conductive wire 16x is extended from the fifth tooth 15a to the eighth segment 17a where the conductive wire 16x is hooked. Thereafter, the conductive wire 16x is extended from the eighth segment 17a, and the above procedure is repeated, so that the conductive wire 16x is finally hooked to the sixth segment 17a once again. Thereby, the winding operation of the windings 16f-16j (the remaining half windings of the windings 16f-16j) using the second flyer is completed.

With the above winding method, the windings 16a-16e of the first winding group, which are wound by the first flyer, are arranged one after another at generally equal angular intervals in the circumferential direction, and the windings 16f-16j of the second winding group, which are wound by the second flyer, are arranged one after another at generally equal intervals in the circumferential direction. Furthermore, the windings 16a-16e, which are wound by the first flyer, and the windings 16f-16j, which are wound by the second flyer, are alternately arranged (are staggered). Therefore, even in the case of the armature 13a of this embodiment, the armature 13a is formed as a product, in which the center of mass of the armature 13a is located at or adjacent to the rotational center of the armature 13a to achieve the relatively good weight balance. Furthermore, the winding method of the above armature 13a is often referred to as a cross-winding method (or simply referred to as cross-winding), which improves the commutating characteristics. Thereby, the commutation balance is improved in the product. For example, the cross-winding may be implemented in a manner described in U.S. Pat. No. 6,320,293, the entire contents of which are incorporated herein by reference.

Next, advantages of the present embodiment in addition to the advantages of the first embodiment will be described.

(1) In the armature 13a of the present embodiment, the windings 16a-16j of the first and second winding group are wound in the two winding cycles by the cross-winding method. In this way, the commutating characteristics are improved, and thereby the rotational balance of the armature 13a is improved. As a result, the vibrations during the rotation of the armature 13a can be reduced.

Third Embodiment

A third embodiment of the present invention will be described with reference to the accompanying drawings.

Figure 5A:
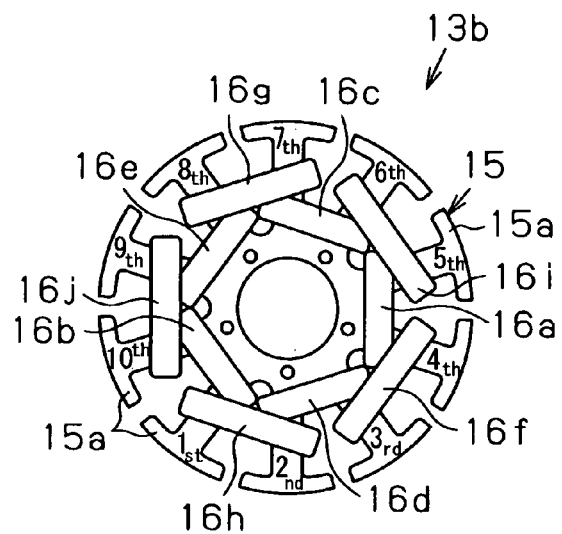
FIG. 5A is a cross sectional view of an armature according to a third embodiment of the present invention.
Figure 5B:
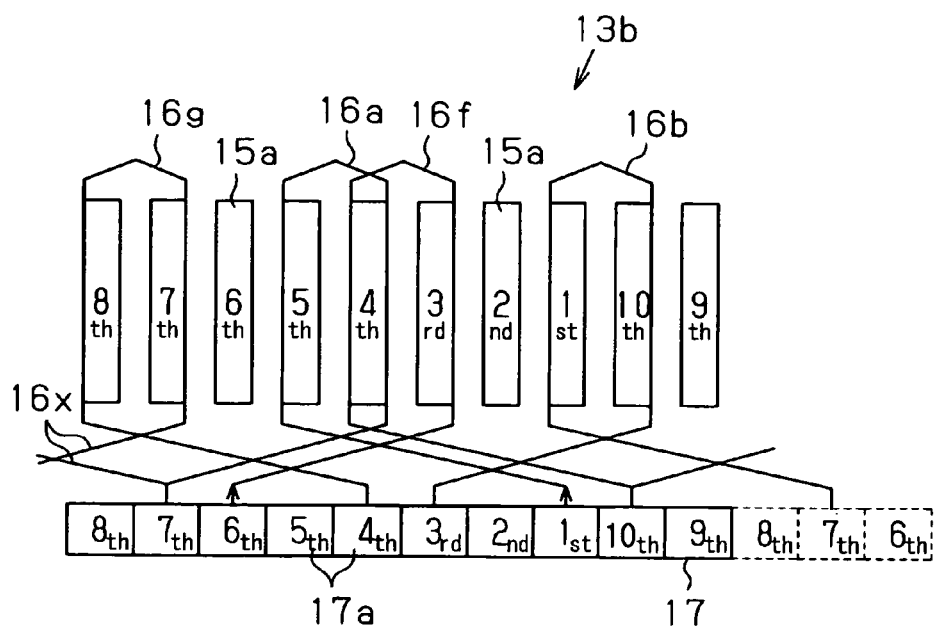
FIG. 5B is a partial deployed winding diagram of the armature shown in FIG. 5A.
Figure 6A:
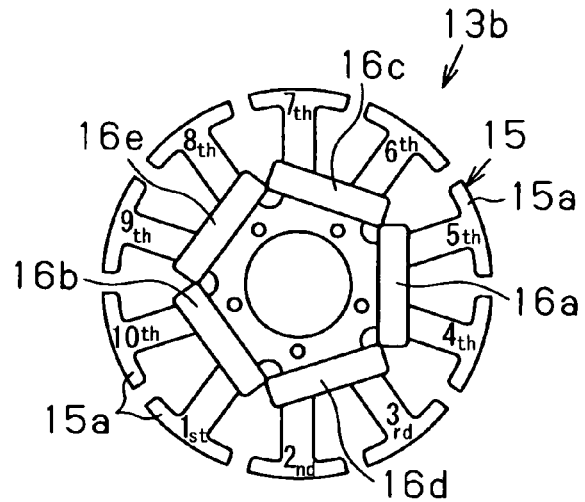
FIG. 6A is a cross sectional view showing a modification of the armature according to the third embodiment after winding of a first layer.
Figure 6B:
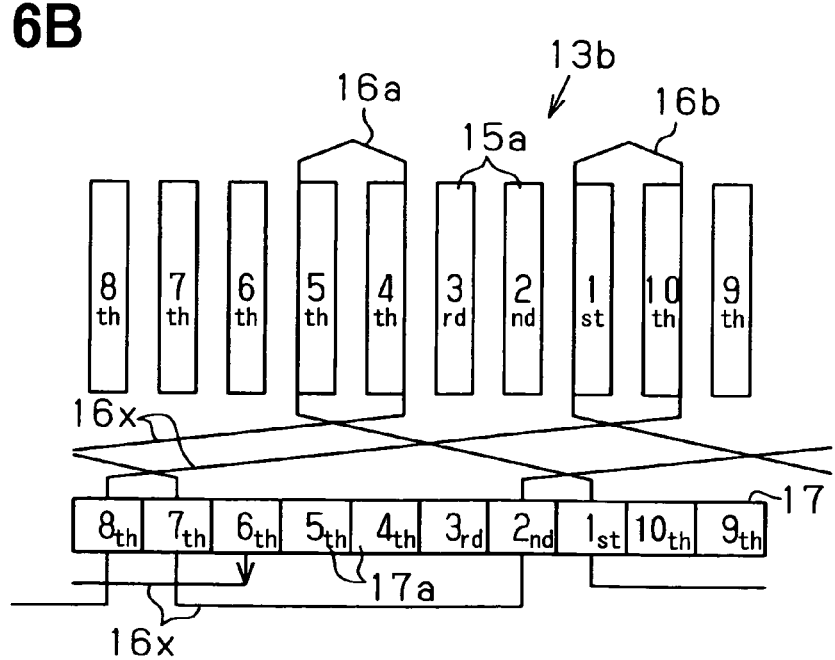
FIG. 6B is a partial deployed winding diagram of the armature shown in FIG. 6A.
Figure 6C:
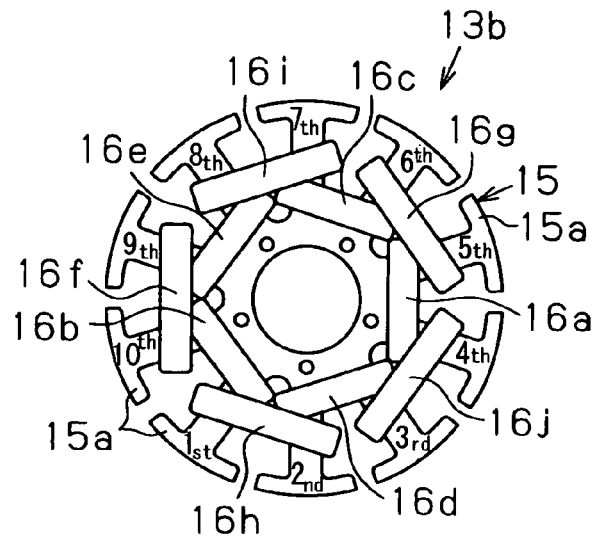
FIG. 6C is a cross sectional view showing the armature according the third embodiment after winding of a second layer.
Figure 6D:
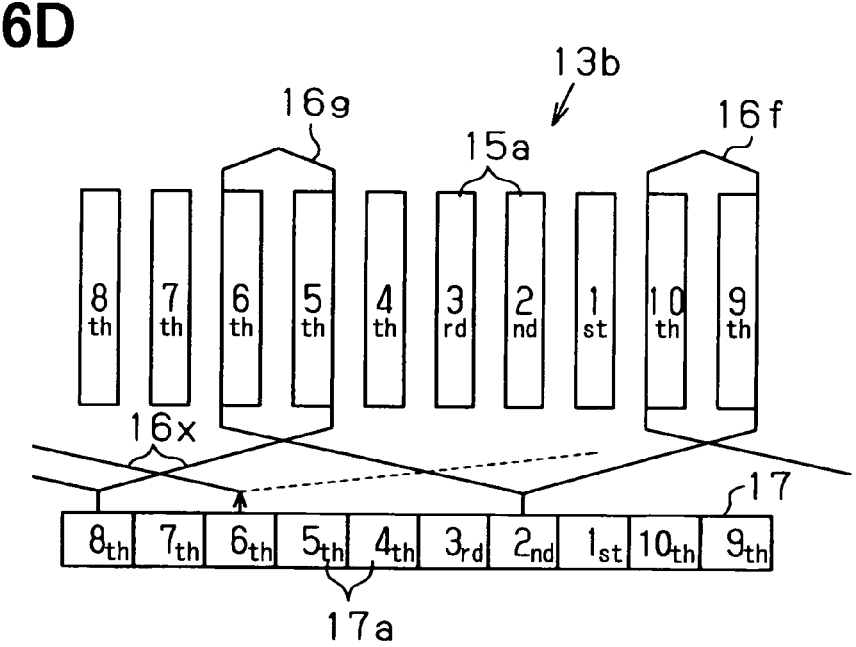
FIG. 6D is a partial deployed winding diagram of the armature shown in FIG. 6C.

As shown in FIGS. 5A and 5B, in the armature 13b of the present embodiment, ten windings 16a-16j are wound around the corresponding teeth 15a by using a single flyer armature winding machine.

Specifically, in the case of the armature 13b of the present embodiment, in a process of forming a first layer, with use of the single flyer, the conductive wire 16x is extended from the first segment 17a (serving as a winding start segment) and is wound around the fifth and fourth teeth 15a a predetermined number of times to form a first winding 16a. Then, the conductive wire 16x is extended from the fourth tooth 15a to the seventh segment 17a where the conductive wire 16x is hooked. Next, the conductive wire 16x is extended from the seventh segment 17a and is wound around the first and tenth teeth 15a a predetermined number of times to form a second winding 16b. Thereafter, the conductive wire 16x is extended from the tenth tooth 15a to the third segment 17a where the conductive wire 16x is hooked. Thereafter, the conductive wire 16x is extended from the third segment 17a, and the above procedure is repeated, so that the conductive wire 16x is finally hooked to the first segment 17a once again. Thereby, the winding operation of the five windings 16a-16e of the first winding group using the single flyer is completed.

Next, in a process of forming a second layer, with use of the single flyer, the conductive wire 16x is extended from the sixth segment 17a (serving as a winding start segment) and is wound around the third and fourth teeth 15a a predetermined number of times to form a first winding 16f in the second layer. Then, the conductive wire 16x is extended from the fourth tooth 15a to the tenth segment 17a where the conductive wire 16x is hooked. Then, the conductive wire 16x is extended from the tenth segment 17a and is wound around the seventh and eighth teeth 15a a predetermined number of times to form a second winding 16g. Thereafter, the conductive wire 16x is extended from the eighth tooth 15a to the fourth segment 17a where the conductive wire 16x is hooked. Thereafter, the conductive wire 16x is extended from the fourth segment 17a, and the above procedure is repeated, so that the conductive wire 16x is finally hooked to the sixth segment 17a once again. Thereby, the winding operation of the five windings 16f-16j of the second winding group using the single flyer is completed.

In this way, the windings 16a-16e of the first winding group in the first layer are arranged one after another at generally equal angular intervals, and the windings 16f-16j of the second winding group in the second layer are arranged one after another at generally equal angular intervals. Also, the windings 16a-16e of the first winding group in the first layer and the windings 16f-16j of the second winding group in the second layer are alternately arranged (are staggered). Thereby, the overlapped portions between the adjacent ones of the windings 16a-16j have the same configurations at the circumferential ends thereof (i.e., being line symmetry about a corresponding imaginary radial line, which is located between the adjacent teeth 15a). As a result, the armature 13b of the present embodiment is formed as a product, in which the center of mass of the armature 13b is located at or adjacent to the rotational center of the armature 13b to achieve the relatively good weight balance.

FIGS. 6A-6D show a modification of the armature 13b of the third embodiment where the short-circuit lines, each of which connects between corresponding two of the segments 17a, are used like in FIGS. 1A and 1B of the first embodiment. The winding method of such an armature 13b using the single flyer armature winding machine will be described.

Specifically, in the case of the armature 13b, in a process of forming a first layer, with use of the single flyer, the conductive wire 16x is extended from the sixth segment 17a (serving as a winding start segment) to the first segment 17a where the conductive wire 16x is hooked to form a short-circuit line between the sixth segment 17a and the first segment 17a. Then, the conductive wire 16x is wound around the fifth and fourth teeth 15a a predetermined number of times to form a first winding 16a, and then the conductive wire 16x is extended from the fourth tooth 15a to the second segment 17a where the conductive wire 16x is hooked. Then, the conductive wire 16x is extended from the second segment 17a to the seventh segment 17a where the conductive wire 16x is hooked, so that a short-circuit line is formed between the second segment 17a and the seventh segment 17a. Next, the conductive wire 16x is extended from the seventh segment 17a and is wound around the first and tenth teeth 15a a predetermined number of times to form a second winding 16b. Then, the conductive wire 16x is extended from the tenth tooth 15a to the eighth segment 17a where the conductive wire 16x is hooked. Thereafter, the conductive wire 16x is extended from the eighth segment 17a to the third segment 17a where the conductive wire 16x is hooked, and the above procedure is repeated, so that the conductive wire 16x is hooked to the sixth segment 17a once again. Thereby, the winding operation of the five windings 16a-16e of the first layer using the single flyer is completed.

Next, in the second layer, with use of the single flyer, the conductive wire 16x is extended from the sixth segment 17a and is wound around the tenth and ninth teeth 15a a predetermined number of times to form a first winding 16f of the second layer. Then, the conductive wire 16x is extended from the ninth tooth 15a to the second segment 17a where the conductive wire 16x is hooked. Then, the conductive wire 16x is extended from the second segment 17a and is wound around the sixth and fifth teeth 15a a predetermined number of times to form a second winding 16g. Thereafter, the conductive wire 16x is extended from the fifth tooth 15a to the eighth segment 17a where the conductive wire 16x is hooked. Thereafter, the conductive wire 16x is extended from the eighth segment 17a, and the above procedure is repeated, so that the conductive wire 16x is finally hooked to the sixth segment 17a once again. Thereby, the winding operation of the five windings 16f-16j of the second layer using the single flyer is completed.

Even in this way, the windings 16a-16e of the first layer are arranged one after another at generally equal angular intervals, and the windings 16f-16j of the second layer are arranged one after another at generally equal angular intervals. Also, the windings 16a-16e of the first layer and the windings 16f-16j of the second layer are alternately arranged (are staggered). Thereby, the overlapped portions between the adjacent ones of the windings 16a-16j have the same configurations at the circumferential ends thereof (i.e., being line symmetry about a corresponding imaginary radial line, which is located between the adjacent teeth 15a). As a result, even in the case of the armature 13b of FIGS. 6A-6D, the armature 13b is formed as a product, in which the center of mass of the armature 13b is located at or adjacent to the rotational center of the armature 13b to achieve the relatively good weight balance. Furthermore, in the case of the armature 13b of FIGS. 6A-6D, the short-circuit lines are formed only at the time of forming the first layer since the short-circuit lines formed in the first layer are sufficient. Therefore, in comparison to the case where the windings of the second layer are wound in the same manner as that of the first layer, the wires can be reduced, and the time required to construct the short-circuit lines can be reduced.

Next, advantages of the third embodiment (and of the modification thereof) will be described.

(1) In the armature 13 of the present embodiment, the windings 16f-16j of the second winding group are wound after the windings 16a-16e of the first winding group are formed. In this way, the overlapped portions between the adjacent ones of the windings have the same configurations at the circumferential ends thereof. As a result, the armature 13 of the present embodiment is formed as a product, in which the center of mass of the armature 13 is located at or adjacent to the rotational center of the armature 13 to achieve the relatively good weight balance.

(2) In the armature 13b of the present embodiment, the windings 16a-16e of the first winding group and the windings 16f-16j of the second winding group are wound from the two locations, respectively, which are most distantly spaced from each other. In this way, the windings 16a-16j are continuously wound, and thereby the biasing in the winding condition of the windings 16a-16j is alleviated. Thus, the windings 16a-16j are arranged uniformly in the rotational direction.

(3) In the armature 13b of the present embodiment, the windings 16f-16j of the second winding group are wound after the windings 16a-16e of the first winding group are wound. Thereby, the armature 13b can be formed using the machine having the single flyer.

The above embodiments of the present invention may be modified as follows.

In the first to third embodiments, the ten windings 16a-16j are used. Alternatively, the number of the windings may be changed to any other even number, which is other than ten. Also, in the armature core 15, the number of the teeth 15a (the ten teeth in the above embodiments) and the number of the magnetic poles (the four magnetic poles in the above embodiments) may be respectively changed to any other appropriate number.

In the first to third embodiments, the windings 16a-16j are wound at the locations, which are most distantly spaced from each other. Alternatively, the windings 16a-16j may be wound at the locations, which are adjacent to each other.

In the first and second embodiments, the windings 16a-16j are simultaneously wound with the double flyer armature winding machine at the two locations, which are displaced from each other by about 180 degrees. Alternatively, the windings 16a-16j may be wound simultaneously at the two locations, which are displaced from each other by any other appropriate angle, which is other than 180 degrees. Also, the windings 16a-16j may be wound non-simultaneously.

In the second embodiment, the windings 16a-16j are wound by the cross-winding method. Alternatively, the first layer and second layer of the windings 16a-16j may be formed as the same winding.

In the third embodiment, the windings 16a-16j are wound with the single flyer armature winding machine. Alternatively, the windings 16a-16j may be wound with the double flyer armature winding machine.

The cross-winding method of the second embodiment may be applied to the armature 13b of the third embodiment.

Additional advantages and modifications will readily occur to those skilled in the art. The invention in its broader terms is therefore not limited to the specific details, representative apparatus, and illustrative examples shown and described.

What is claimed is:

1. An armature comprising:
  a commutator;
  an armature core that is rotatable together with the commutator and includes a plurality of teeth, which are arranged one after another at generally equal angular intervals; and
  a plurality of windings, each of which is wound around corresponding two or more of the plurality of teeth and is connected to the commutator, wherein:
  each circumferentially adjacent two of the plurality of windings partially circumferentially overlap with each other;
  a total number of the plurality of windings is an even number;
  the plurality of windings is divided into a first winding group and a second winding group;

the windings of the first winding group are arranged one after another at generally equal angular intervals without circumferentially overlapping with each other; and the windings of the second winding group are arranged one after another at generally equal angular intervals without circumferentially overlapping with each other and are wound separately from the windings of the first winding group; and each of the windings of the first winding group is diametrically opposed to and is generally parallel to a corresponding one of the windings of the second winding group.

2. The armature according to claim 1, wherein:
the windings of the first winding group are wound starting from a first location; and
the windings of the second winding group are wound starting from a second location, which is different from the first location.

3. The armature according to claim 2, wherein:
a total number of the windings in the first winding group is an odd number;
a total number of the windings in the second winding group is an odd number; and
the first location and the second location are displaced from each other by about 180 degrees.

4. The armature according to claim 1, wherein the windings of the second winding winging group are wound after the windings of the first winding group are wound.

5. The armature according to claim 1, wherein each of the windings of the first winding group and a corresponding one of the windings of the second winding group are wound at corresponding two different locations, which are most spaced from each other.

6. The armature according to claim 1, wherein each of the windings of the first winding group and the windings of the second winding group is wound in two steps such that a first part of the winding, which is wound in a first step, and a second part of the winding, which is wound in a second step, are wound around common two or more of the plurality of teeth.

7. The armature according to claim 1, wherein:
the windings of the first winding group are formed continuously from a first magnet wire; and
the windings of the second winding group are formed continuously from a second magnet wire.

8. The armature according to claim 1, wherein the armature is part of a dynamoelectric machine.

9. A manufacturing method of an armature, comprising:
providing a commutator and an armature core, wherein the armature core is rotatable together with the commutator and includes a plurality of teeth, which are arranged one after another at generally equal angular intervals; and
forming a plurality of windings such that:
each of the plurality of windings is wound around corresponding two or more of the plurality of teeth and is connected to the commutator;
each circumferentially adjacent two of the plurality of windings partially circumferentially overlap with each other;
a total number of the plurality of windings is an even number;
the plurality of windings is divided into a first winding group and a second winding group;
the windings of the first winding group are wound with a first flyer of a double flyer armature winding machine and are arranged one after another at generally equal angular intervals without circumferentially overlapping with each other; and the windings of the second winding group are wound with a second flyer of the double flyer armature winding machine and are arranged one after another at generally equal angular intervals without circumferentially overlapping with each other such that each of the windings of the first winding group is diametrically opposed to and is generally parallel to a corresponding one of the windings of the second winding group and are wound separately from the windings of the first winding group.

10. The manufacturing method according to claim 9, wherein the forming of the plurality of windings includes forming the windings of the first winding group starting from a first location and forming the windings of the second winding group starting from a second location, which is different from the first location, and the forming of the windings of the first winding group at the first location and the forming of the windings of the second winding group at the second location are executed simultaneously.

11. The manufacturing method according to claim 10, wherein:
a total number of the windings in the first winding group is an odd number;
a total number of the windings in the second winding group is an odd number; and
the first location and the second location are displaced from each other by about 180 degrees.

12. The manufacturing method according to claim 9, wherein the forming of the plurality of windings includes forming the windings of the first winding group and thereafter forming the windings of the second winding group.

13. The manufacturing method according to claim 9, wherein the forming of the plurality of windings includes forming each of the windings of the first winding group and a corresponding one of the windings of the second winding group at corresponding two different locations, respectively, which are most spaced from each other.

14. The manufacturing method according to claim 9, wherein the forming of the plurality of windings includes forming each of the windings of the first winding group and the windings of the second winding group in two steps such that a first part of the winding, which is wound in a first step, and a second part of the winding, which is wound in the second step, are wound around common two or more of the plurality of teeth.

15. The manufacturing method according to claim 9, wherein the forming of the plurality of windings includes:
forming the windings of the first winding winging group continuously from a first magnet wire; and
forming the windings of the second winding group continuously from a second magnet wire.

16. The manufacturing method according to claim 15, wherein:
the forming of the windings of the first winding group includes feeding the first magnet wire from a first location; and
the forming of the windings of the second winding group includes feeding the second magnet wire from a second location, which is displaced from the first location by about 180 degrees.

17. An armature comprising:
a rotatable shaft;
a commutator that is fixed to the rotatable shaft;
an armature core that is fixed to the rotatable shaft, is adjacent to the commutator and includes a plurality of teeth, wherein the teeth are arranged one after another at generally equal angular intervals; and a plurality of windings divided into a first winding group and a second winding group, wherein each of the windings is wound around corresponding teeth and is connected to the commutator, each of the windings of the first winding group is diametrically opposed to and is generally parallel to a corresponding one of the windings of the second winding group, two circumferentially adjacent windings partially overlap with each other, the windings of the first winding group are wound by a first flyer and are arranged one after another at generally equal angular intervals without circumferentially overlapping with each other, and the windings of the second winding group are wound by a second flyer, are wound separately from the windings of the first winding group, and are arranged one after another at generally equal angular intervals without circumferentially overlapping with each other.

18. The armature according to claim 17, wherein
the windings of the first winding group are wound from a first starting location, and
the windings of the second winding group are wound from a second starting location, which is different from the first starting location.

19. The armature according to claim 18, wherein
a total number of the windings in the first winding group is an odd number,
a total number of the windings in the second winding group is an odd number, and
the first location is located by about 180 degrees from the second location about the rotatable shaft.

20. The armature according to claim 17, wherein the windings of the first winding group and the second winding group are wound in two steps such that a first part of the winding, which is wound in a first step, and a second part of the winding, which is wound in a second step, are wound around a common two or more of the teeth.

* * * * *